(12) United States Patent
Roberts et al.

(10) Patent No.: US 7,072,323 B2
(45) Date of Patent: Jul. 4, 2006

(54) SYSTEM AND METHOD FOR PERFORMING SOFT HANDOFF IN A WIRELESS DATA NETWORK

(75) Inventors: Robin U. Roberts, Orlando, FL (US); Charles R. Barker, Jr., Orlando, FL (US)

(73) Assignee: MeshNetworks, Inc., Maitlands, FL (US)

(*) Notice: Subject to any disclaimer, the term of this patent is extended or adjusted under 35 U.S.C. 154(b) by 1019 days.

(21) Appl. No.: 09/929,031

(22) Filed: Aug. 15, 2001

(65) Prior Publication Data

US 2003/0091011 A1 May 15, 2003

(51) Int. Cl.
*H04Q 7/24* (2006.01)
(52) U.S. Cl. .................................. 370/338; 370/331
(58) Field of Classification Search ............ 370/310, 370/310.2, 328, 338, 349, 331; 455/436, 455/432.1, 435.1
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |

(Continued)

FOREIGN PATENT DOCUMENTS

CA     2132180     3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Wellington Chin
*Assistant Examiner*—Brenda Pham
(74) *Attorney, Agent, or Firm*—Randi L. Karpinia; Joseph J. Euczynski

(57) ABSTRACT

A communications network which is capable of effectively and efficiently handling mobility of wireless user terminals between access point nodes of a packet-switched network with minimal overhead and packet loss, and a method for using the same. The communications network employs a packet-switched core network and a plurality of access points coupled to the core network. Each access point is adapted to provide any user terminal with wireless communications access to the core network when that user terminal becomes affiliated with that access point. The system and method further employ ad-hoc routing techniques during handoff of a wireless user terminal between access point nodes of the core network to enable the network to maintain multiple paths via which data packets are provided to the user terminal during handoff to substantially eliminate packet loss during handoff.

33 Claims, 9 Drawing Sheets

U.S. PATENT DOCUMENTS

| | | | | |
|---|---|---|---|---|
| 5,555,540 A | 9/1996 | Radke | ......................... | 370/16.1 |
| 5,572,528 A | 11/1996 | Shuen | ...................... | 370/85.13 |
| 5,615,212 A | 3/1997 | Ruszczyk et al. | ............ | 370/433 |
| 5,618,045 A | 4/1997 | Kagan et al. | .................. | 463/40 |
| 5,621,732 A | 4/1997 | Osawa | ......................... | 370/79 |
| 5,623,495 A | 4/1997 | Eng et al. | ..................... | 370/397 |
| 5,627,976 A | 5/1997 | McFarland et al. | .......... | 395/308 |
| 5,631,897 A | 5/1997 | Pacheco et al. | .............. | 370/237 |
| 5,644,576 A | 7/1997 | Bauchot et al. | .............. | 370/437 |
| 5,652,751 A | 7/1997 | Sharony | ...................... | 370/227 |
| 5,680,392 A | 10/1997 | Semaan | ........................ | 370/261 |
| 5,684,794 A | 11/1997 | Lopez et al. | ................ | 370/337 |
| 5,687,194 A | 11/1997 | Paneth et al. | ................ | 375/283 |
| 5,696,903 A | 12/1997 | Mahany | ................. | 395/200.58 |
| 5,701,294 A | 12/1997 | Ward et al. | ................... | 370/252 |
| 5,706,428 A | 1/1998 | Boer et al. | ................... | 395/200 |
| 5,717,689 A | 2/1998 | Ayanoglu | ..................... | 370/349 |
| 5,745,483 A | 4/1998 | Nakagawa et al. | ........... | 370/335 |
| 5,774,876 A | 6/1998 | Woolley et al. | ................ | 705/28 |
| 5,781,540 A | 7/1998 | Malcolm et al. | ............. | 370/321 |
| 5,787,080 A | 7/1998 | Hulyalkar et al. | ........... | 370/348 |
| 5,794,154 A | 8/1998 | Bar-On et al. | ............... | 455/509 |
| 5,796,732 A | 8/1998 | Mazzola et al. | ............. | 370/362 |
| 5,796,741 A | 8/1998 | Saito et al. | ................... | 370/439 |
| 5,805,593 A | 9/1998 | Busche | ......................... | 370/396 |
| 5,805,842 A | 9/1998 | Nagaraj et al. | .............. | 395/306 |
| 5,805,977 A | 9/1998 | Hill et al. | .................... | 455/31.3 |
| 5,809,518 A | 9/1998 | Lee | ............................. | 711/115 |
| 5,822,309 A | 10/1998 | Ayanoglu et al. | ............ | 370/315 |
| 5,844,905 A | 12/1998 | McKay et al. | ............... | 370/443 |
| 5,845,097 A | 12/1998 | Kang et al. | .................. | 395/297 |
| 5,857,084 A | 1/1999 | Klein | ........................... | 395/309 |
| 5,870,350 A | 2/1999 | Bertin et al. | ................. | 365/233 |
| 5,877,724 A | 3/1999 | Davis | .......................... | 342/357 |
| 5,881,095 A | 3/1999 | Cadd | .......................... | 375/202 |
| 5,881,372 A | 3/1999 | Kruys | ......................... | 455/113 |
| 5,886,992 A | 3/1999 | Raatikainen et al. | ........ | 370/410 |
| 5,896,561 A | 4/1999 | Schrader et al. | ............ | 455/67.1 |
| 5,903,559 A | 5/1999 | Acharya et al. | ............. | 370/355 |
| 5,909,651 A | 6/1999 | Chander et al. | ............. | 455/466 |
| 5,936,953 A | 8/1999 | Simmons | ..................... | 370/364 |
| 5,943,322 A | 8/1999 | Mayor et al. | ................ | 370/280 |
| 5,958,018 A | 9/1999 | Eng et al. | | |
| 5,987,011 A | 11/1999 | Toh | ............................ | 370/331 |
| 5,987,033 A | 11/1999 | Boer et al. | ................... | 370/445 |
| 5,991,279 A | 11/1999 | Haugli et al. | ................ | 370/311 |
| 6,028,853 A | 2/2000 | Haartsen | ...................... | 370/338 |
| 6,029,217 A | 2/2000 | Arimilli et al. | ............. | 710/107 |
| 6,034,542 A | 3/2000 | Ridgeway | ..................... | 326/39 |
| 6,044,062 A | 3/2000 | Brownrigg et al. | .......... | 370/238 |
| 6,047,330 A | 4/2000 | Stracke, Jr. | .................. | 709/238 |
| 6,052,594 A | 4/2000 | Chuang et al. | .............. | 455/450 |
| 6,052,752 A | 4/2000 | Kwon | .......................... | 710/126 |
| 6,064,626 A | 5/2000 | Stevens | ....................... | 365/233 |
| 6,067,291 A | 5/2000 | Kamerman et al. | .......... | 370/338 |
| 6,078,566 A | 6/2000 | Kikinis | ........................ | 370/286 |
| 6,104,712 A | 8/2000 | Robert et al. | ................ | 370/389 |
| 6,108,738 A | 8/2000 | Chambers et al. | ........... | 710/113 |
| 6,115,580 A | 9/2000 | Chuprun et al. | ............... | 455/1 |
| 6,122,690 A | 9/2000 | Nannetti et al. | ............. | 710/102 |
| 6,130,881 A | 10/2000 | Stiller et al. | ................. | 370/238 |
| 6,132,306 A | 10/2000 | Trompower | ................ | 453/11.1 |
| 6,147,975 A | 11/2000 | Bowman-Amuah | .......... | 370/252 |
| 6,163,699 A | 12/2000 | Naor et al. | ................... | 455/453 |
| 6,178,337 B1 | 1/2001 | Spartz et al. | ................ | 455/561 |
| 6,192,053 B1 | 2/2001 | Angelico et al. | ............ | 370/448 |
| 6,192,230 B1 | 2/2001 | van Bokhorst et al. | ...... | 455/343 |
| 6,208,870 B1 | 3/2001 | Lorello et al. | ............... | 455/466 |
| 6,223,240 B1 | 4/2001 | Odenwald et al. | ........... | 710/129 |
| 6,240,294 B1 | 5/2001 | Hamilton et al. | ............ | 455/456 |
| 6,246,875 B1 | 6/2001 | Seazholtz et al. | ............ | 455/432 |
| 6,249,516 B1 | 6/2001 | Brownrigg et al. | .......... | 370/338 |
| 6,275,707 B1 | 8/2001 | Reed et al. | .................. | 455/456 |
| 6,285,892 B1 | 9/2001 | Hulyalkar | .................... | 455/574 |
| 6,304,556 B1 | 10/2001 | Haas | ........................... | 370/254 |
| 6,327,300 B1 | 12/2001 | Souissi et al. | ............... | 375/219 |
| 6,349,091 B1 | 2/2002 | Li | ............................... | 370/238 |
| 6,349,210 B1 | 2/2002 | Li | ............................... | 455/450 |
| 6,434,134 B1 * | 8/2002 | La Porta et al. | ............. | 370/338 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR PERFORMING SOFT HANDOFF IN A WIRELESS DATA NETWORK

CROSS-REFERENCE TO RELATED APPLICATIONS

Related subject matter is disclosed in a U.S. patent application of Charles R. Barker, Jr. and Robin U. Roberts entitled "A System and Method for Providing an Addressing and Proxy Scheme for Facilitating Mobility of Wireless Nodes Between Wired Access Points on a Core Network of a Communications Network", application Ser. No. 09/929,032 filed on even date herewith, the entire contents of which is incorporated herein by reference.

BACKGROUND OF THE INVENTION

1. Field of the Invention

The present invention relates to an improved system and method for performing soft handoff between access points of a wireless communications network. More particularly, the present invention relates to a system and method for performing soft handoff using ad-hoc routing and multiple access points of a packet-switched communications network.

2. Description of the Related Art:

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network includes a plurality of interconnected base stations that are distributed geographically at designated locations throughout the service area. Each base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets. As can be appreciated by one skilled in the art, the transceiver and user terminals transmit and receive the data packets in multiplexed format, such as time-division multiple access (TDMA) format, code-division multiple access (CDMA) format, or frequency-division multiple access (FDMA) format, which enables a single transceiver at the base station to communicate simultaneously with several user terminals in its coverage area.

Because each base station can only handle a limited amount of communications signal traffic from the user terminals at any given time, the coverage area of a base station can vary depending on the amount of traffic that the base station is expected to experience. For example, the coverage area of a base station can be set to several miles in diameter in sparsely populated regions, such as rural regions having light wireless traffic, and can be set to less than a mile in diameter in densely populated regions, such as major metropolitan areas having heavy wireless traffic. The wireless communications network therefore must employ many base stations in heavily populated metropolitan areas in order for the network to adequately service the user terminals in those regions.

Each base station is also connected to one or more gateways that enable communication between the base station and other networks, such as the Internet and the public switched telephone network (PSTN). Accordingly, the base stations in the network enable the user terminals to communicate with each other, as well as with other destinations, such as telephony devices, in the PSTN.

Since wireless user terminals are typically mobile, it is common for a user terminal to travel between different base station coverage areas during use. When this occurs, the base station whose coverage area the user terminal is leaving must transfer or "handoff" the user terminal to the base station whose coverage area the user terminal is entering, so that the latter base station can become the base station via which the user terminal and network continue to communicate. In densely populated areas having many base stations with small coverage areas, this handoff process may need to occur several times during a short period of time as the user terminal travels between the different coverage areas.

Many techniques have been developed using the circuit-switched cellular infrastructure to minimize data packet loss during handoff while also minimizing overhead necessary to successfully perform the handoff. For example, a technique known as "hard handoff" refers to a break-before-make technique where the original connection is dropped before the new connection is established. On the other hand, "soft handoff" is a make-before-break technique that maintains multiple simultaneous connections to the user terminal during handoff, and only drops the original connection after the new connection is established. Examples of soft handoff techniques are described in a publication by Wong et al. entitled "Soft Handoffs in CDMA Mobile Systems", IEEE Personal Communications, December 1997, pp. 6–17, in a publication by Wong et al. entitled "A Pattern Recognition System for Handoff Algorithms", IEEE Journal on Selected Areas in Communications, Vol. 18, No. 7, July 2000, pp. 1301–1312, and in TIA document TIA/EIA-95-B entitled "Mobile Station-Base Station Compatibility Standard for Wideband Spread Spectrum Cellular Systems", Feb. 1, 1999, the entire contents of each of these documents being incorporated herein by reference.

With the arrival of the Internet in recent years, some wireless communications networks have moved away from the use of conventional cellular networks and their associated circuit switched routing techniques to improve voice communications services. Each mobile user terminal, telephony device, and any other device capable of communicating with the communications network, has a unique Internet Protocol (IP) address that uniquely identifies it from all other devices. A communications network employing IP sends data between destination points in digital form in discrete packets, rather than in the traditional circuit-committed protocols of the PSTN. Each of the data packets includes the sender's IP address as well as the intended receiver's IP address.

When a wireless user terminal, for example, transmits voice data to a base station of the communications network acting as the access point for the user terminal, a router associated with the base station reads the receiver IP address in the data packet. Each router includes a table of routing information, such as IP addresses of the devices local to the router, available routes, and so on. If the router recognizes from the receiver IP address that the data packet is intended for a telephony device in its immediate neighborhood or domain, the router forwards the data packet to that telephony device. However, if the router does not recognize the IP address as belonging to such a telephony device, the router forwards the data packet to an appropriate adjacent gateway in, for example, the Internet. The router of that gateway then reads the receiver IP address in the data packet, and either delivers the data packet to the appropriate telephony device in its domain, or forwards the data packet to another gateway. Once a router in a gateway recognizes the receiver IP address as belonging to a telephony device in its domain, the router in that gateway delivers the data packet to that telephony device.

It can be also noted that the use of IP to route data packets in a communications network enables the network to handle data other than voice data. For example, such IP techniques can be used to expand the versatility of the network to communicate audio, video or multimedia data between user terminals.

As in traditional cellular communications networks, wireless user terminals in a wireless communications network employing IP can be mobile, and can thus periodically change their access point to the network. Also, wireless user terminals can move outside their "home" network and become temporarily affiliated with a foreign network, and thus communicate via an access point on that foreign network.

Existing mobile data communications networks using IP techniques are based around conventional circuit-switched cellular infrastructures as discussed above, and therefore mask packet routing issues internal to their own networks. That is, when a user terminal moves its affiliation from one access point or base station to another within the network, the network can perform handoff techniques similar to those performed by a conventional wireless cellular network.

However, when a user terminal moves away from its home network and becomes affiliated with an access point on a foreign network, such topology changes must be communicated between routers in the home and foreign networks, so that the routers can update their respective routing tables as necessary, which results in substantial bandwidth-consuming overhead. Accordingly, it is generally agreed that this solution is too slow to handle user terminals that may be constantly mobile between networks, because routing changes must be propagated across the entirety of the connected network.

Another technique to handle the mobility of user terminals between networks without performing router updates is referred to as Mobile IP. A detailed description of Mobile IP is set forth in IETF document RFC 2002 entitled "IP Mobility Support", October 1996, the entire content of which is incorporated herein by reference. In accordance with the Mobile IP technique, a fixed access point on the mobile user terminal's home network, which can be referred to as a fixed network node, functions as a proxy agent (MIP home agent) for the mobile user terminal (mobile node) when the mobile node moves out of the home network and becomes affiliated with an access point (foreign node) on a foreign network. As understood in the Mobile IP art, the home network is the network at which the mobile node seems reachable to the rest of the Internet or to other networks by virtue of the mobile node's assigned IP address (home address), and a foreign network is the network to which the mobile node is attached when it is not attached to its home network.

Accordingly, when data packets are transmitted from another device to the mobile node, the Mobile IP home agent receives those data packets on the core home network behalf of the mobile node, and encapsulates those data packets. That is, the Mobile IP home agent incorporates each received IP data packet, less any preceding fields such as a media access control (MAC) header, inside another IP data packet, thereby making the fields within the original IP header of the IP data packet temporarily lose their effect. The Mobile IP home agent then tunnels those encapsulated data packet to an agent (Mobile IP foreign agent) on the foreign network to which the mobile node is currently attached. The Mobile IP foreign agent decomposes the capsule and sends the packet to the mobile node, which is currently local to the foreign agent.

Although the Mobile IP technique is reasonably capable of handling the mobility of user terminals between networks, the Mobile IP technique does increase overhead in the networks, since each data packet must be routed to the home network, encapsulated, and then rerouted to the foreign network. Also, the problems solved by Mobile IP can be viewed as those associated with a macro case of mobility in which nodes (user terminals) are mobile between core networks. Mobile IP is unsuitable for handling a micro case of mobility in which user terminals are mobile between wired access points in a single core network.

One solution for managing mobility within a circuit-switched cellular network has been proposed and is referred to as Cellular IP. A description of Cellular IP is set forth in a publication by Andras G. Valko entitled "Cellular IP: A New Approach to Internet Host Mobility", ACM Computer Communication Review, January 1999, the entire content of which is incorporated herein by reference. Although this solution is somewhat suitable for handling mobility in circuit-switched cellular networks, the technique is specific to the circuit-switched infrastructure of the network.

As can further be appreciated by one skilled in the art, while Mobile IP is suitable for handling cases of user terminal mobility between networks, Mobile IP is deficient in handling problems with packet routing that may occur within a packet-switched core network when a mobile node moves and is handed off from one base station to another. A communications network employing a packet-switched core network is described, for example, in U.S. patent application Ser. No. 09/897,790 entitled "Ad Hoc Peer-to-Peer Mobile Radio Access System Interfaced to the PSTN and Cellular Networks", filed on Jun. 29, 2001, the entire content of which is incorporated herein by reference. An example of a wireless local area network (LAN) having mobility is set forth in IEEE Standard 802.11, Aug. 20, 1999, the entire content of which is incorporated herein by reference. Specifically, Mobile IP is incapable of effectively operating under the additional constraints imposed by a packet-switched core network having wired access point nodes that are typically connected using bandwidth-constrained leased lines and which cannot tolerate the additional overhead of twice-routed Mobile IP packets. Furthermore, the low-cost access point nodes also typically cannot tolerate the processor-intensive decomposition of encapsulated packets that is performed during Mobile IP.

In addition to the above deficiencies, other problems involving the manner in which handoff is performed can arise. As explained above, when a user terminal is handed off from one access point to another, the wired network must dynamically reconfigure itself to route packets through the new attachment point. It is often difficult for the wired network to reconfigure itself without the loss of packets sent to the user terminal, because the wired network reconfiguration is not instantaneous. Accordingly, during the reconfiguration period, packets can be sent via both the old and new attachment points. Hence, in existing wireless data networks, one set of these packets will typically be lost.

Furthermore, as the speed of mobility increases, the frequency in which handoff occurs also increases. With this increase in occurrence of handoff, any loss of packets during handoff becomes more noticeable to the user because it occurs more often. Thus, minimizing packet loss during handoff becomes more important as the speed of mobility increases.

Accordingly, a need exists for a system and method capable of effectively and efficiently handling mobility of wireless user terminals between access point nodes of a packet-switched network with minimal overhead and packet loss.

SUMMARY OF THE INVENTION

An object of the present invention is to provide a system and method capable of effectively and efficiently handling mobility of wireless user terminals between access point nodes of a communications network, in particular, a packet-switched network, with minimal overhead and packet loss.

Another object of the present invention is to provide a system and method employing ad-hoc routing techniques for handing off a wireless user terminal between access point nodes of a packet-switched communications network to enable the network to maintain multiple paths via which data packets are provided to the user terminal during handoff to substantially eliminate packet loss during handoff.

These and other objects are substantially achieved by providing a communications network adapted for use with mobile wireless user terminals, and a method for controlling the network to perform handoff of the user terminals between access points on the network. The network comprises a packet-switched core network, and a plurality of access points coupled to the core network. Each access point is adapted to provide any user terminal with communications access to the core network when the user terminal becomes affiliated with the access point, and includes an address resolution cache which is adapted to store information representative of affiliation between the user terminals and the access points. Each access point can also provide communications access to any user terminal operating in an ad-hoc network.

When the user terminal changes its affiliation from a first access point to a second access point, a node on the core network other than the first and second access points, such as another access point, a media server, a DNS server, or an IP gateway router, is adapted to continue to send data packets intended for receipt by the user terminal to the first access point until having updated its respective address resolution cache based on a message indicating that the user terminal has changed its affiliation from the first access point to the second access point. The first access point is adapted to continue to send the data packets received from the other node to the user terminal via the wireless connection without sending the data packets to the second access point. Also, an additional node other than the first and second access points and the other node is adapted to send data packets intended for receipt by the user terminal to the second access point after having updated its respective address resolution cache based on the message while the other node continues to send data packets intended for the user terminal to the first access point which continues to send the data packets received from the other node to the user terminal without sending the data packets to the second access point. Furthermore, the second access point is adapted to issue said message over said core network as an address resolution request, such as an address resolution protocol (ARP) request, for an address, such as an IP protocol address, of the user terminal which has changed its affiliation thereto.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
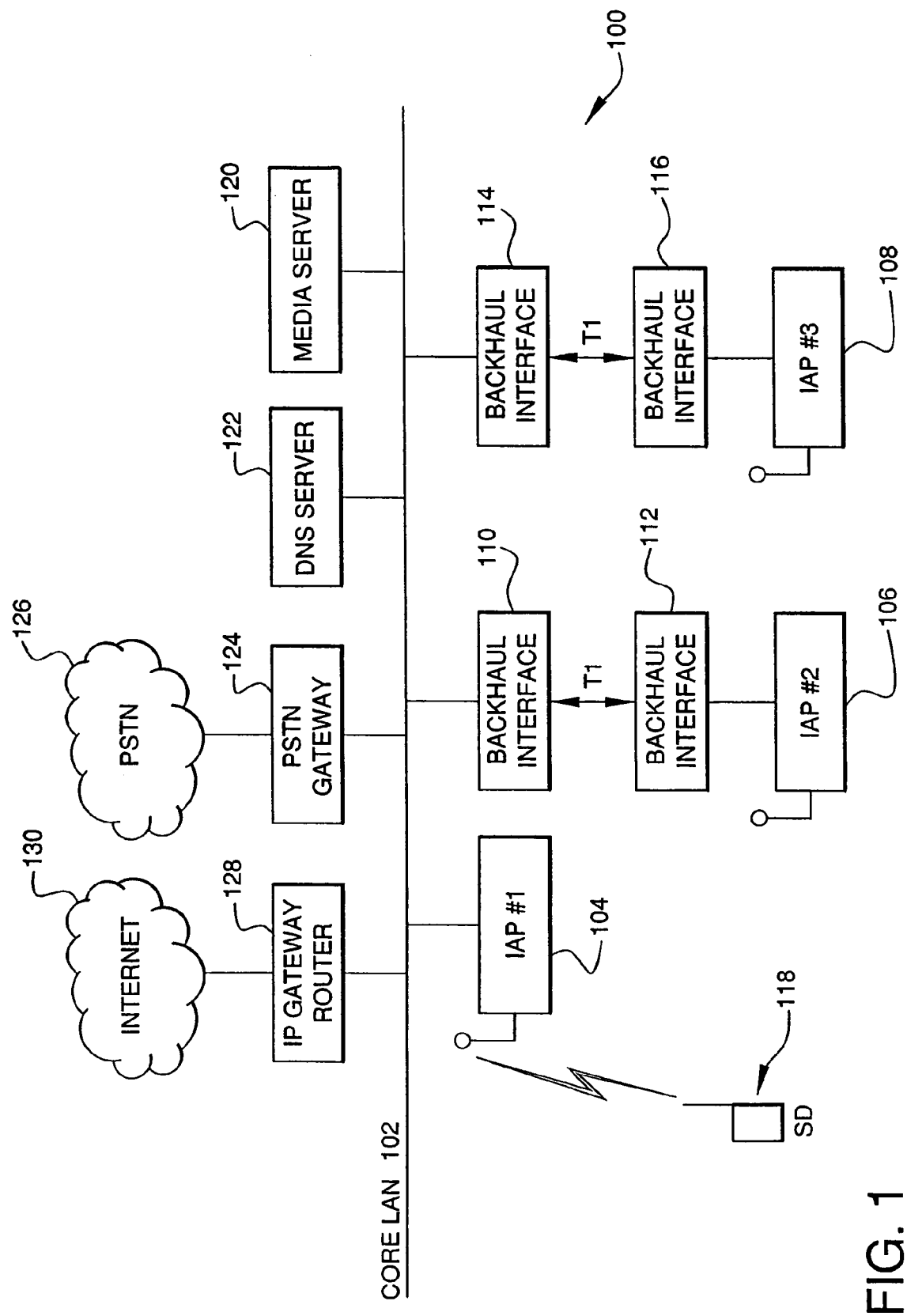
FIG. 1 is a block diagram of an example of a wireless communications network employing a system and method for handling user terminal mobility within the network according to an embodiment of the present invention.

FIG. 1 is a block diagram illustrating an example of a wireless communications network 100 employing a system and method for handling user terminal mobility within the network according to an embodiment of the present invention. As shown, network 100, which can be referred to as a "core network", includes a core local access network (LAN) 102 which provides the wired infrastructure for the network 100. A plurality of intelligent access points (IAP) 104, 106 and 108 are coupled to and communicate with the core LAN 102. As illustrated in this example, IAP 104 is directly coupled to the core LAN 102, while IAP 106 is coupled to core LAN 102 via backhaul interfaces 110 and 112 and a T1 connection, and IAP 108 is coupled to core LAN 102 via backhaul interfaces 114 and 116 and a T1 connection. However, any suitable backhaul technology, such as T3, fiber and microwave, can be used. Hence, the IAPs 104, 106 and 108 need not be fixed, but rather, can be configured to move and can communicate with the core LAN 102 via a wireless backhaul, such as a microwave backhaul.

Each IAP 104, 106 and 108 is an infrastructure device containing at least one transceiver and at least one embedded processor. In this example, each IAP 104, 106 and 108 further includes a 10/100 Base-T Ethernet connection. However, the IAPs 104, 106 and 108 can include any type of high-speed connection suitable for coupling to the core LAN 102. An IAP 104, 106 and 108 is configured to remain in a fixed location, such as on a building rooftop or in a building ceiling, and is provided with a permanent source of power, such as alternating current or any other suitable power source.

As described in more detail below, an IAP 104, 106 and 108 operates to provide access for subscriber devices, such as mobile user terminals 118, to wired services provided by the network 100. Each IAP 104, 106 and 108 also provides a respective fixed and known position and location reference, relay and wireless routing for user terminals 118 within its area of coverage, and the principle network management interface with transceivers in wireless routers and subscriber devices, such as user terminals 118. Each wired IAP 104, 106 and 108 can be referred to generally as a "fixed node" on the network 100, while the mobile user terminal 118 can be referred to as a "mobile node". The wired IAP 104, 106 and 108 can also function as access points to the network 100 for user terminals 118 forming an ad-hoc network as described, for example, in U.S. patent application Ser. No. 09/897,790 reference above, and as in U.S. Pat. No. 5,943,322 to Mayor, the entire contents of each being incorporated by reference herein.

The network 100 further may include a media server 120 for delivering types of media such as video and multimedia data to the core LAN 102, and a domain name server (DNS) 122 for translating Internet domain names into Internet Protocol (IP) addresses in a manner as known in the art. The network 100 may also include a PSTN gateway 124 which provides data access between the network 100 and the PSTN 126, and an IP gateway router 128 which provides data access between the network 100 and the Internet 130.

Further details of the network 100 and its operation will now be described. For purposes of this discussion, the terms "IAP" and "node" or "fixed node" will be used interchangeably, as well as the terms "user terminal" and "mobile node". The wired IAPs 104, 106 and 108 on the core LAN 102 are all fully connected to a single virtual segment. As can be appreciated by one skilled in the art, all IAPs 104, 106 and 108 (fixed nodes) on the virtual segment are directly accessible from any other node at the logical link layer. IP routing is not used to reach any other node on the virtual segment. The IP subnet for this virtual segment is large enough to encompass all of the IAPs 104, 106 and 108, and all mobile nodes 118 in a single broadcast domain. The virtual segment may include media access control layer (MAC-layer) bridges and switches (not shown) between the IAPs 104, 106 and 108, as needed, to filter unicast frames from using bandwidth on non-required links.

The wired IAPs 104, 106 and 108 will, by definition, have two network interfaces, one of which is connected to the network via a wire-line link, and the other being a wireless transceiver. Both of these interfaces will have IP addresses from the core network's IP subnet. An IAP 104, 106 and 108 must then retain an IP routing table indicating that the IP of the wireless transceiver interface is reachable on that interface, while all other IP addresses on that subnet are reachable directly on the wired interface. IP's outside the core network's subnet are reachable via the core network's directly accessible IP gateway router 128.

Figure 2:
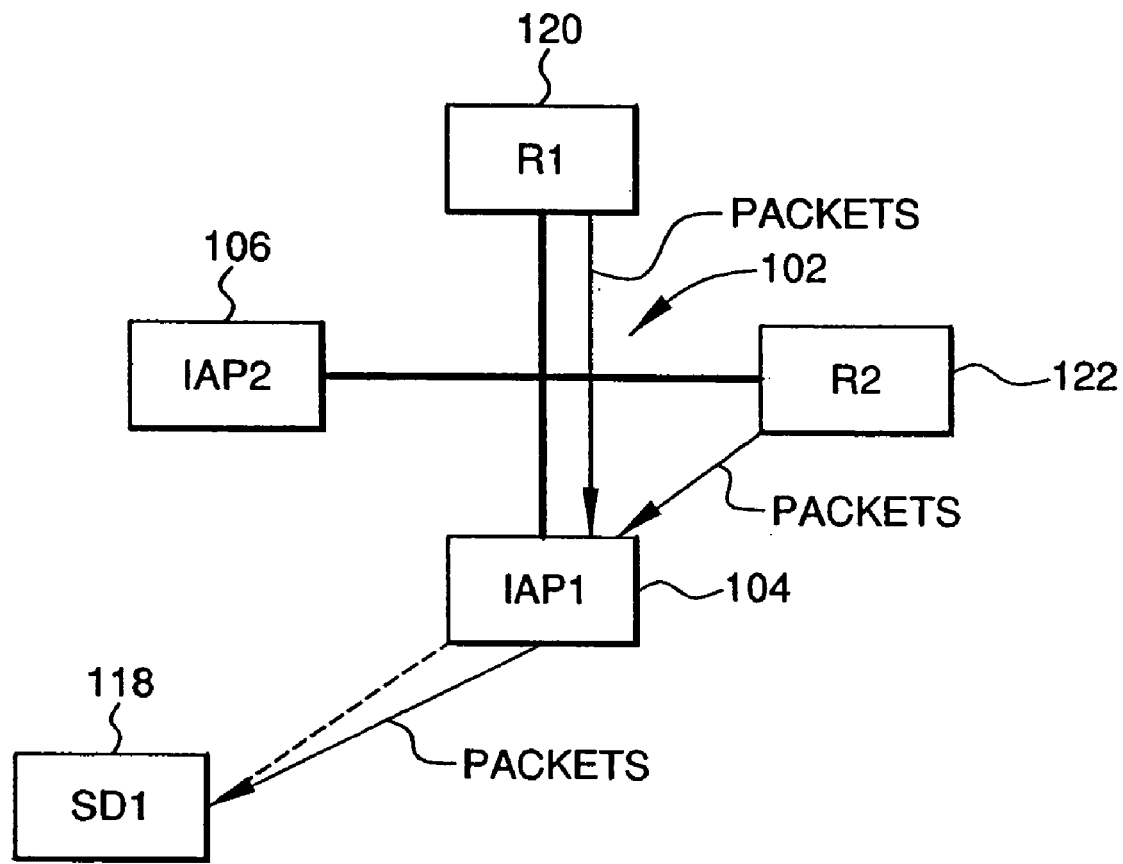
FIG. 2 is a conceptual block diagram illustrating affiliation of a mobile user terminal with an access point of the network shown in FIG. 1.
Figure 3:
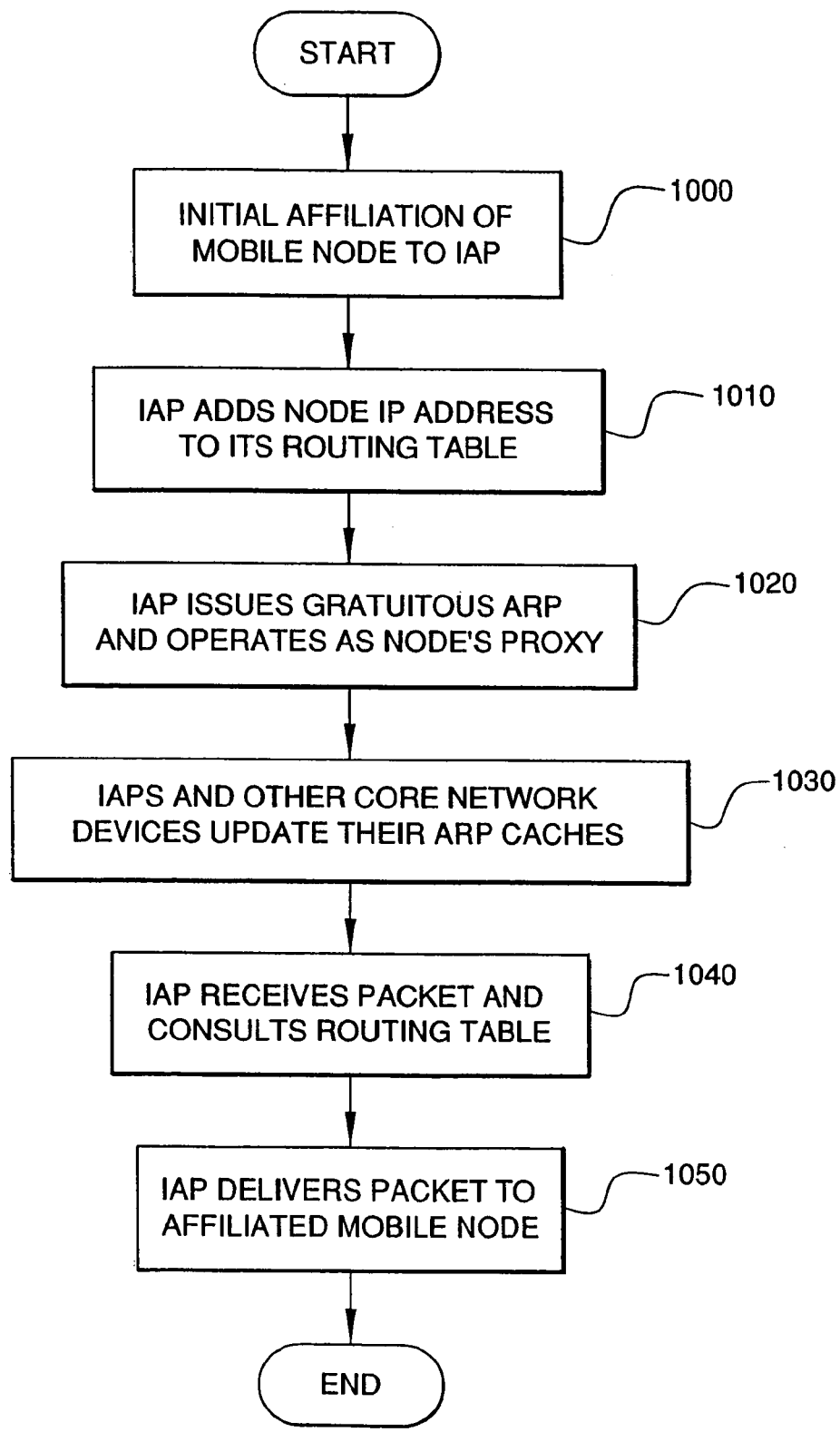
FIG. 3 is a flowchart illustrating an example of operations performed by the network shown in FIG. 1 when a mobile user terminal affiliates with an access point as shown in FIGS. 1 and 2.

The process by which a mobile node affiliates with an IAP will now be described with reference to FIGS. 1–3. As a mobile node (user terminal) 118 affiliates to a wired IAP 104, the wired IAP 104 will add that mobile node's IP address to its routing table, indicating that this mobile node is directly accessible via the wireless transceiver. This overrides the default subnet-wide entry only for this particular mobile node. It is noted that the mobile node 118 can affiliate with IAP 104 via a direct communication link, or via other mobile nodes in the ad-hoc network already affiliated with IAP 104. As shown in FIGS. 1 and 2 and in step 1000 in FIG. 3, mobile node 118 initially affiliates to IAP 104, which is identified as IAP1 in FIG. 2. Accordingly, in step 1010, IAP 104 adds the IP address of mobile node 118 to its own routing table, indicating that this mobile node 118 is directly accessible via the wireless transceiver of IAP 104. Upon doing so, wired IAP 104 must begin acting as the mobile node's proxy on the core network 100 in step 1020. This implies that IAP 104 will answer to address resolution requests, such as address resolution protocol (ARP) requests, on the core network 100 for the mobile node's IP address as if it were the mobile node 118. Other nodes on the core network 100, such as IAPs 106 and 108, as well as media server 120 (router R1 in FIG. 2), DNS server 122 (router R2 in FIG. 2) and IP gateway router 124 (not shown in FIG. 2), will then associate the IP address of the mobile node 118 to the MAC address of the wired interface of the wired IAP 104 via their respective ARP caching mechanisms in step 1030.

Furthermore, as indicated in step 1040, when a packet destined for the mobile node 118 is received by the IAP 104, the IAP 104 must consult its IP routing table and forward the packet on the proper interface, which is the wireless transceiver of the IAP 104, as indicated in step 1050. This allows the wired IAP 104 to be a "point of presence" on the core network 100 to represent the mobile node 118 as a proxy.

Figure 4:
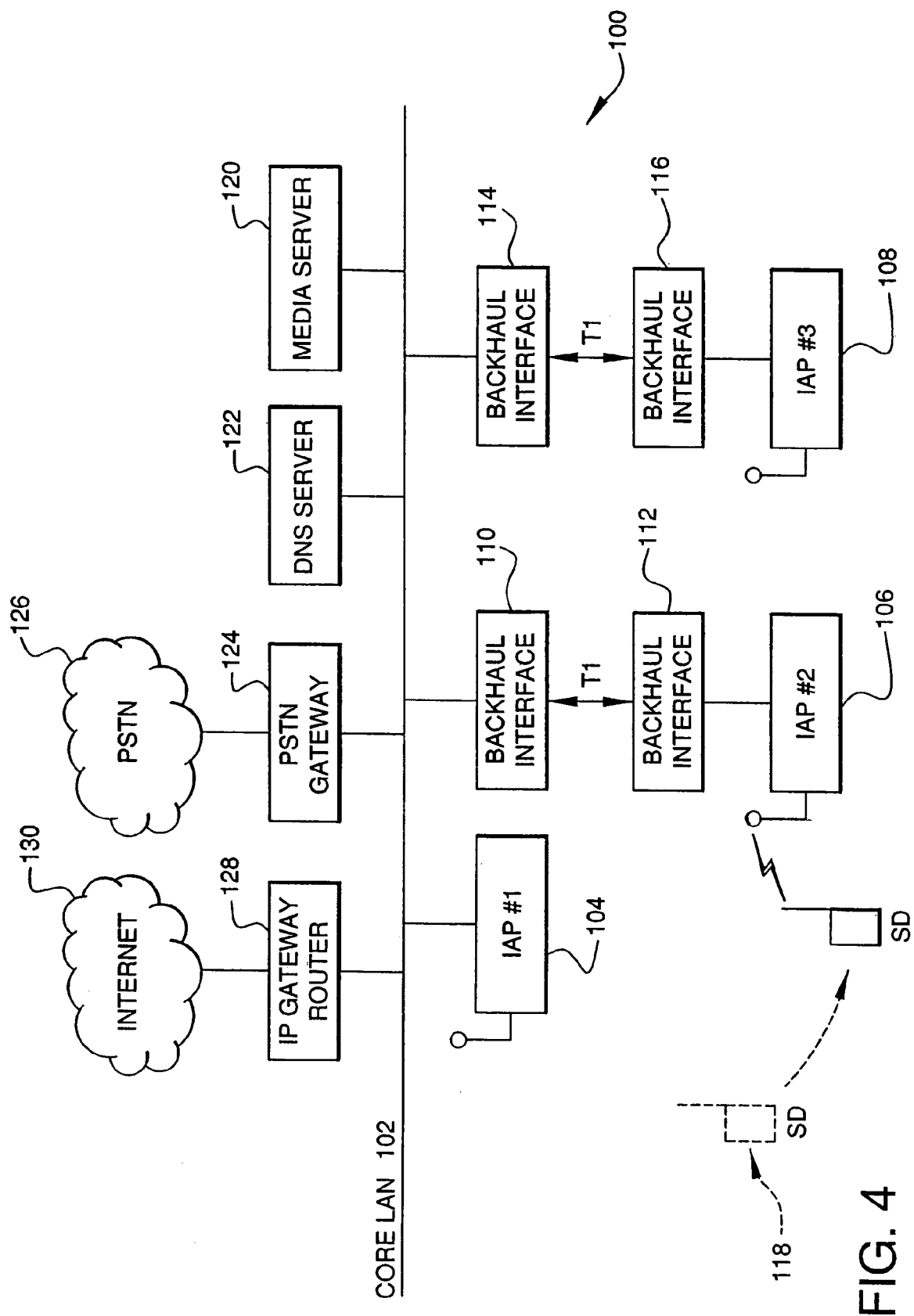
FIG. 4 is a block diagram of the network shown in FIG. 1 in which a mobile user terminal changes its affiliation from one access point to another.
Figure 5:
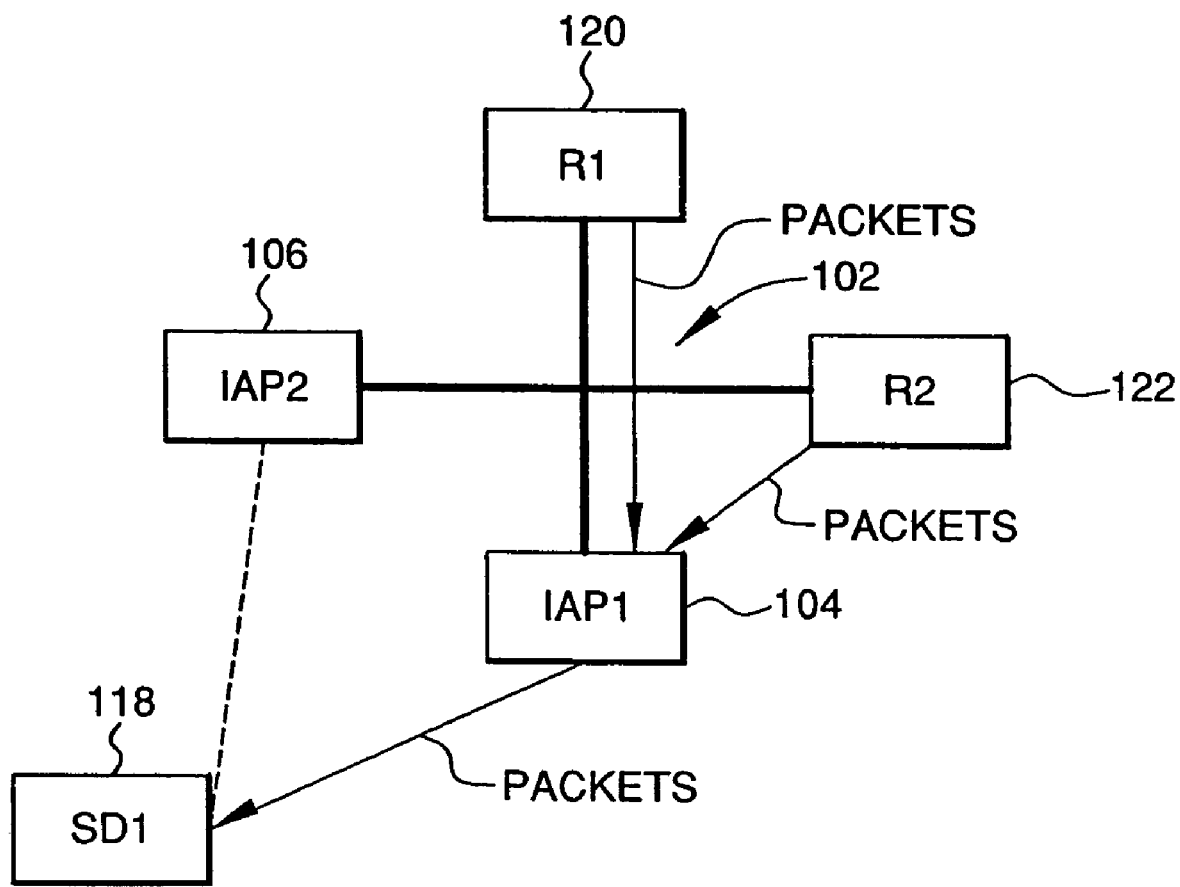
FIG. 5 is a conceptual block diagram illustrating the manner in which a user terminal changes its affiliation with an access point of the network as shown in FIG. 4.
Figure 6:
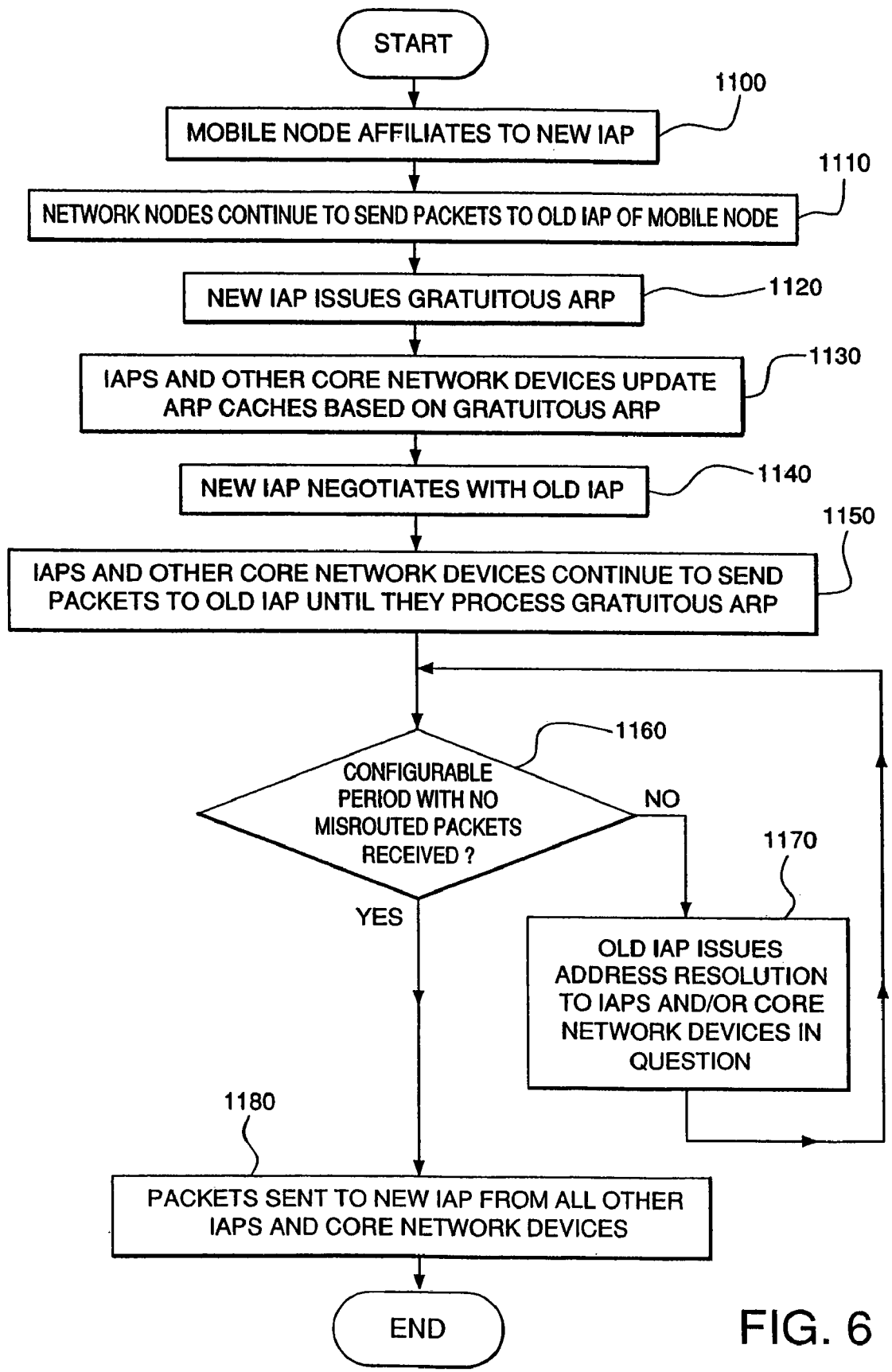
FIG. 6 is a flowchart illustrating an example of operations performed by the network as shown in FIGS. 1 and 4 when the mobile user terminal changes its access point affiliation as shown in FIGS. 4 and 5.

It is also necessary for the network 100 to handle the movement of nodes between wired IAPs as will now be described. As shown in FIGS. 4 and 5 and indicated in step 1100 in FIG. 6, if a mobile node 118 should affiliate to a new IAP, for example, IAP 106, after having received traffic at an original IAP 104, other nodes on the network (e.g., IAP 108, media server 120, DNS server 122 and IP gateway router 124) would be unaware of the change unless certain measures are taken. Hence, their address resolution protocol (ARP) caches would associate the IP of the mobile node 118 to the MAC address of the original IAP 104, so packets from an uninformed node (e.g., IAP 108, media server 120, DNS server 122 or IP gateway router 124) would never reach the new IAP 106.

Figure 7:
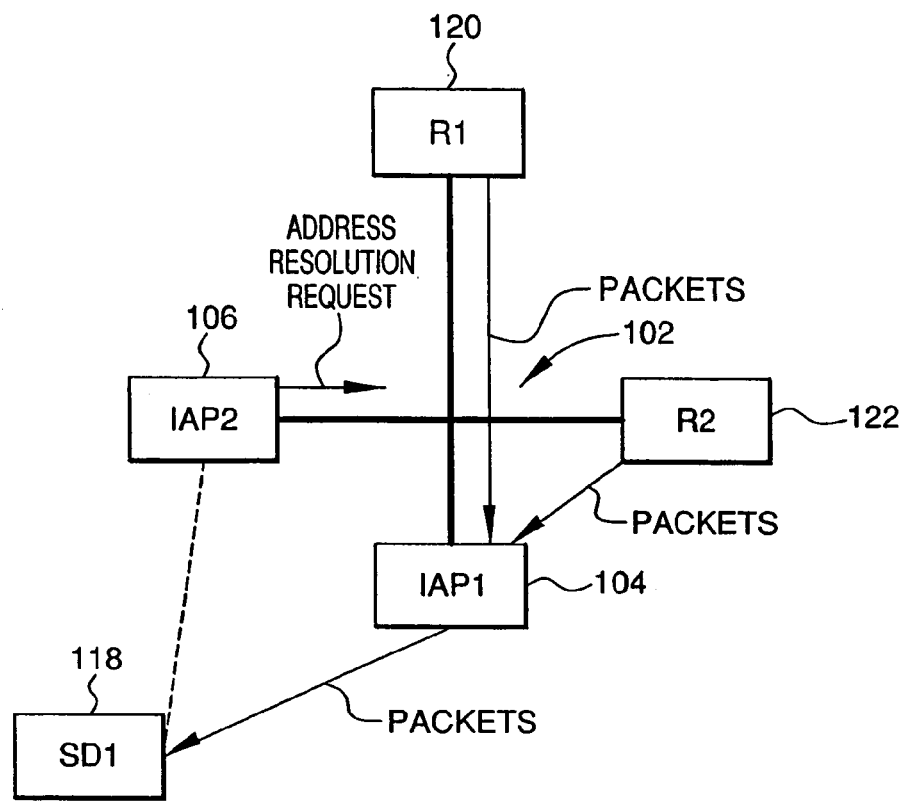
FIG. 7 is a conceptual block diagram illustrating an example of the manner in which the access point to which the user terminal is affiliating communicates this affiliation to the network.

To circumvent this problem, a procedure known as "gratuitous ARP" can be performed in accordance with an embodiment of the present invention. As shown in FIG. 5 and in step 1110 of FIG. 6, before the "gratuitous ARP" procedure is performed, the nodes on the network 100, such as media server 120 and DNS server 122, continue to send packets intended for mobile node 118 to IAP 104. As indicated in step 1120 and in FIG. 7, the IAP with which the mobile node 118 has newly become associated (i.e., IAP 106) issues an ARP request on network 100 for the mobile node's own IP address. This forces an update to the ARP caches of other nodes (e.g., IAPs 104 and 108, media server 120, DNS server 122 and IP gateway router 124) on the network 100 to the nodes new point of presence, as indicated in step 1130. Further descriptions of ARP caches and gratuitous ARPs are set forth on page 62 of IETF document RFC 2002 referenced above, as well as on page 20 of IETF document RFC 1009 entitled "Requirements for Internet Gateways", June 1987, and in IETF document RFC 826 entitled "An Ethernet Address Resolution Protocol", November 1982, the entire contents of each of these documents are incorporated herein by reference. Also, other types of ARP-like mechanisms can be used to update the address resolution caches of the other nodes (IAPs 104 and 108, media server 120, DNS server 122 and IP gateway router 124), such as those mechanisms described in IETF document RFC 2461 entitled "Neighbor Discovery for IP Version 6 (Ipv6)", December 1998 and in IETF document RFC 2332 entitled "NBMA Next Hop Resolution Protocol", April 1998, the entire contents of these documents being incorporated herein by reference.

Hence, other nodes (IAPS 104 and 108, media server 120, DNS server 122 and IP gateway router 124)) will now associate the IP address of the mobile node 118 to the MAC address of the new IAP 106. However, the prior route for packets (i.e., to mobile node 118 via IAP 104) will be maintained for a configurable period to ensure that packets continue to reach the mobile node 118 while the wired network routing is being updated. This ensures an uninterrupted packet stream is maintained. Furthermore, it is important to note that at no time are packets destined for the mobile node forwarded from IAP 104 to IAP 106 during the reconfiguration.

Figure 8:
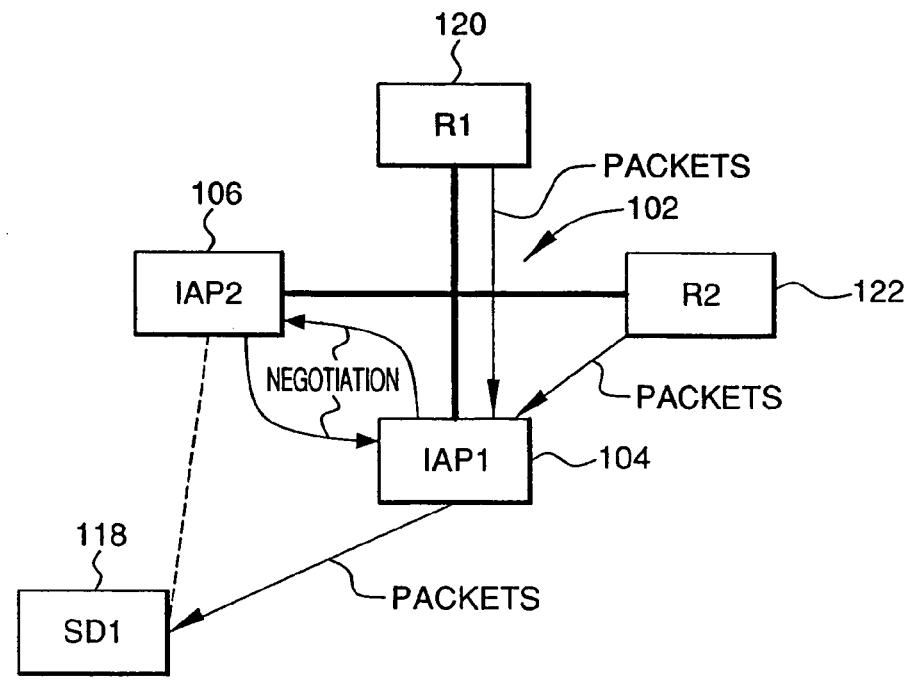
FIG. 8 is a conceptual block diagram illustrating an example of the manner in which packets are routed during handoff and an exemplary manner in which the access points involved in the handoff negotiate with each other.

As further indicated in step 1140 and as shown in FIG. 8, the new IAP 106 begins to negotiate with the IAP 104 with which the mobile node 118 was previously affiliated to remove the explicit route for the mobile node 118 from this original IAP's IP routing table. For example, the gratuitous ARP may server as the negotiation, or separate messaging may be used.

Figure 9:
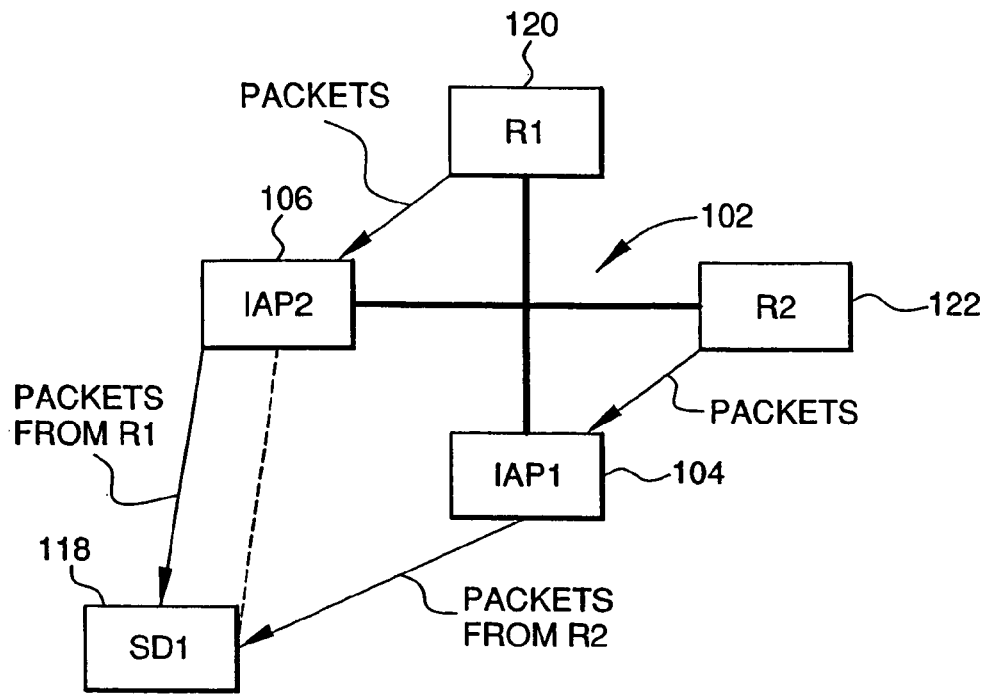
FIG. 9 is a conceptual block diagram illustrating an example of the manner in which routers in the network operate to forward packets to the reaffiliated user while they are processing the reaffiliation communication from the access point with which the user terminal has become affiliated.
Figure 11:
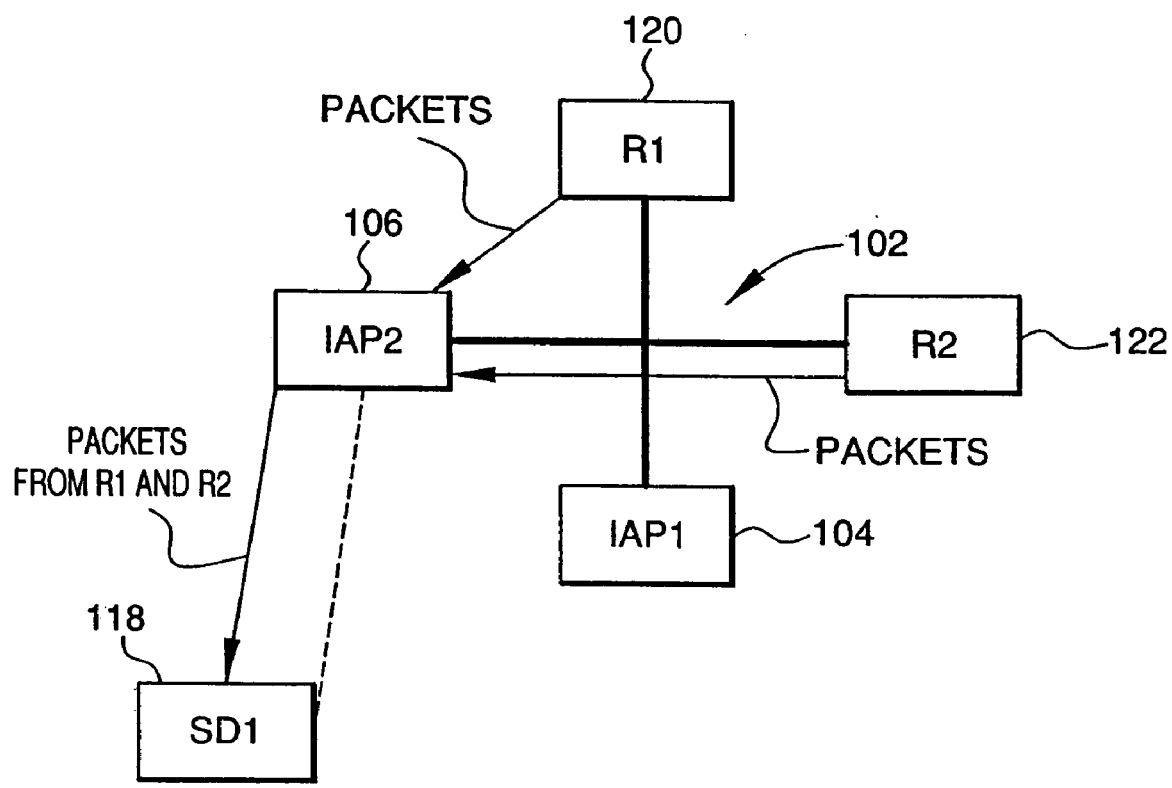
FIG. 11 is a conceptual block diagram illustrating an example of the manner in which routers forward packets to the access point with which the user terminal has become affiliated after they have processed the reaffiliation communication.

It is further noted that the broadcast of the reconfiguration notification, that is, the gratuitous ARP, can on occasion be unreliable or may not immediately be processed by one or more of the nodes on the network 100. For example, as shown in FIG. 9, the media server 120 (router R1) has received and processed the gratuitous ARP, and is thus sending packets intended for mobile node 118 to the new IAP 106 with which mobile node 118 has become affiliated. However, the DNS server 122 (router R2) has either not received the gratuitous ARP or has not yet processed the gratuitous ARP. Accordingly, DNS server 122, and all other nodes that have either not received or have not yet processed the gratuitous ARP, will continue to send packets intended for mobile node 118 to the old IAP 104 as indicated in step 1150 in FIG. 6. Once the DNS server 122 has processed the gratuitous ARP, DNS server 122 will then begin to send packets intended for mobile node 118 to the new IAP 106, as shown in FIG. 11.

Figure 10:
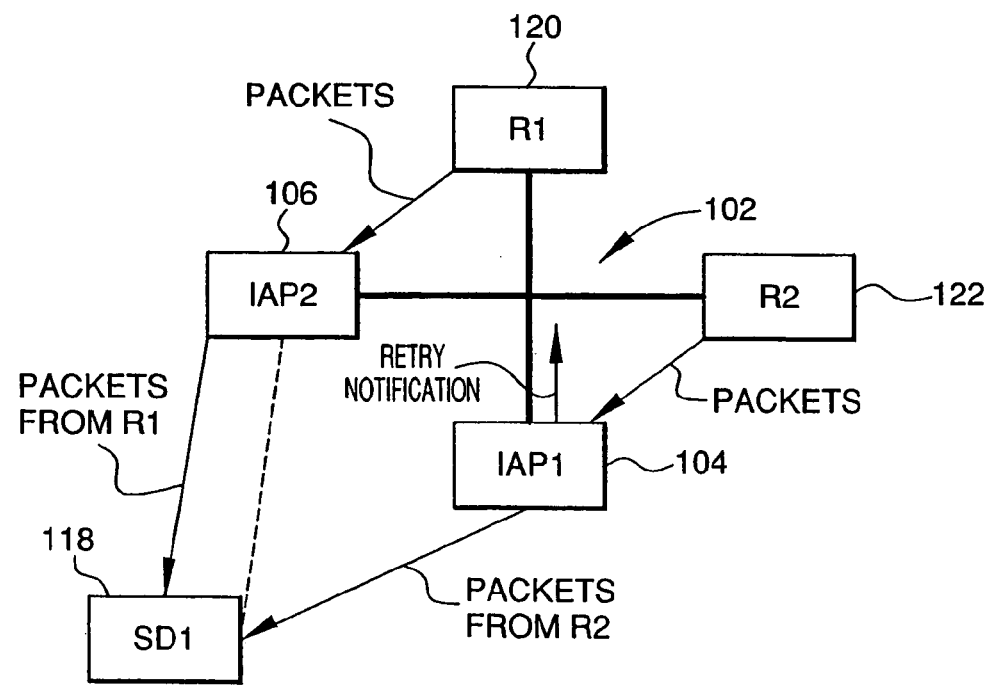
FIG. 10 is a conceptual block diagram illustrating the manner in which the access point from which the user terminal is changing its affiliation communicates this change to the network.

It is also noted that if the IAP 104 continues to receive packets from one or more network nodes after a configurable period, such as a predetermined duration of time (e.g., a few seconds) after the gratuitous ARP has been issued by IAP 106, it will be determined in step 1160 that a network node or nodes must have missed the broadcast of the gratuitous ARP. To overcome this unreliability, a selective retry mechanism can be performed as indicated in step 1170. For example, the IAP 104 can send a notification to the network node or nodes, as shown in FIG. 10. This notification can either be a broadcast notification, such as a gratuitous ARP, or can be a unicast message to the network node or nodes that are continuing to send packets intended for mobile node 118 to IAP 104. This retry can be triggered a configurable number of times to complete the wired network reconfiguration. After the configurable time period in step 1160, if IAP 104 receives no packets intended for mobile node 118, it is assumed that all packets on the core network 100 are now being sent by default to the wired interface of IAP 106 from all core network nodes, as indicated in step 1180 and in FIG. 11. The new IAP 106 then completes its negotiation with the IAP 104 with which the mobile node 118 was previously affiliated to remove the explicit route for the mobile node 118 from this original IAP's IP routing table.

If the mobile node 118 reaffiliates with another IAP (e.g., IAP 108), the above process shown and described with reference to FIGS. 4–11 is repeated.

It is further noted that the solution described above provides for virtual presence of mobile nodes 118 on a core network 100 and the fall mobility of those nodes between access points on that network. When combined with Mobile IP techniques as discussed in the Background section above, nodes 118 may transit any IAPs, regardless of whether they are on the home network or a foreign network, only using Mobile IP techniques when transitioning between a home network and a foreign networks.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A communications network, adapted for use with mobile wireless user terminals, said network comprising:
    a packet-switched core network; and
    a plurality of access points coupled to said core network, each said access point being adapted to provide any said user terminal with communications access to said core network when said any user terminal becomes affiliated with said access point, and including an address resolution cache which is adapted to store information representative of affiliation between said user terminals and said access points, and when a said user terminal changes its affiliation from a first said access point to a second said access point, an other node on said core network other than said first and second access points is adapted to continue to send data packets intended for receipt by said user terminal to said first access point until having updated its respective address resolution cache based on a message indicating that a said user terminal has changed its affiliation from said first access point to said second access point, and said first access point is adapted to continue to send said data packets received from said other node to said user terminal without sending said data packets to said second access point,
    wherein when said user terminal changes its affiliation from a first said access point to a second said access point, an additional node other than said first and second access points and said other node is adapted to send data packets intended for receipt by said user terminal to said second access point after having updated its respective address resolution cache based on said message while said other node continues to send data packets intended for said user terminal to said first access point which continues to send said data packets received from said other node to said user terminal without sending said data packets to said second access point.

2. A communications network as claimed in claim 1, wherein:
said additional node includes a said access point.

3. A communications network as claimed in claim 1, wherein:
said other node includes a said access point.

4. A communications network as claimed in claim 1, wherein:
said second access point is adapted to issue said message over said core network as an address resolution request for an address or said user terminal which has changed its affiliation thereto.

5. A communications network as claimed in claim 4, wherein:
said address resolution request includes an address resolution protocol request.

6. A communications network as claimed in claim 4, wherein:
said address of said user terminal includes an Internet protocol address assigned to said user terminal.

7. A communications network as claimed in claim 1, wherein:
said access point with which a said user terminal is affiliated is adapted to transmit a received data packet to said user terminal via a wireless communications link.

8. A communications network as claimed in claim 1, wherein:.
each said access point includes a wireless transceiver, adapted to transmit and receive data packets to and from a said user terminal affiliated therewith via a wireless communications link.

9. A communications network as claimed in claim 1, wherein:
each said address resolution cache includes an address resolution protocol cache.

10. A communications network as claimed in claim 1, further comprising:
at least one of a media server, DNS server and an IP gateway router, each including a respective an address resolution cache which is adapted to store information representative of affiliation between said user terminals and said access points and is updateable based on said message.

11. A communications network as claimed in claim 10, wherein:
said other node includes said media server, said DNS server or said IP gateway router.

12. A communications network as claimed in claim 10, wherein:
said address resolution cache includes an address resolution protocol cache.

13. A communications network as claimed in claim 1, wherein:
each said access point is adapted to provide any said user terminal with communications access to said core network when said user terminal is participating in an ad-hoc network.

14. A method for performing handoff of mobile wireless user terminals between access points on a packet-switched core network in a communications network, each said access point being adapted to provide any said user terminal with communications access to said core network when said any user terminal becomes affiliated with said access point, and including an address resolution cache which is adapted to store information representative of affiliation between said user terminals and said access points, the method comprising:
when a said user terminal changes its affiliation from a first said access point to a second said access point, controlling an other node on said core network other than said first and second access points to continue to send data packets intended for receipt by said user terminal to said first access point until having updated its respective address resolution cache based on a message indicating that a said user terminal has changed its affiliation from said first access point to said second access point; and
while said other node continues to send said data packets to said first access point, controlling said first access point to continue to send said data packets received from said other node to said user terminal without sending said data packets to said second access point,
wherein when said user terminal changes its affiliation from a first said access point to a second said access point, controlling an additional node other than said first and second access points and said other node to send data packets intended for receipt by said user terminal to said second access point after having updated its respective address resolution cache based on said message while said other node continues to send data packets intended for said user terminal to said first access point which continues to send said data packets received from said other node to said user terminal without sending said data packets to said second access point.

15. A method as claimed in claim 14, wherein:
said additional node includes a said access point.

16. A method as claimed in claim 14, wherein:
said other node includes a said access point.

17. A method as claimed in claim 14, further comprising:
controlling said second access point to issue said message over said core network as an address resolution request for an address of said user terminal which has changed its affiliation thereto.

18. A method as claimed in claim 17, wherein:
said address resolution request includes an address resolution protocol request.

19. A method as claimed in claim 17, wherein:
said address of said user terminal includes an Internet protocol address assigned to said user terminal.

20. A method as claimed in claim 14, further comprising:
controlling a said access point with which a said user terminal is affiliated is adapted to transmit a received data packet to said user terminal via a wireless communications link.

21. A method as claimed in claim 14, wherein:
each said address resolution cache includes an address resolution protocol cache.

22. A method as claimed in claim 14, wherein:
said other node includes a media server, a DNS server or an IP gateway router.

23. A method as claimed in claim 14, further comprising:
controlling each said access point to provide any said user terminal with communications access to said core network when said user terminal is participating in an ad-hoc network.

24. A computer-readable medium of instructions for controlling a communications network having access points on a packet-switched core network to perform handoff of mobile wireless user terminals between said access points, each said access point being adapted to provide any said user terminal with communications access to said core network when said any user terminal becomes affiliated with said access point, and including an address resolution cache which is adapted to store information representative of affiliation between said user terminals and said access points, the computer-readable medium of instructions comprising:
   a first set of instructions which, when a said user terminal changes its affiliation from a first said access point to a second said access point, is adapted to control an other node on said core network other than said first and second access points to continue to send data packets intended for receipt by said user terminal to said first access point until having updated its respective address resolution cache based on a message indicating that a said user terminal has changed its affiliation from said first access point to said second access point;
   a second set of instructions which, while said other node continues to send said data packets to said first access point, is adapted to control said first access point to continue to send said data packers received from said other node to said user terminal without sending said data packets to said second access point, and
   a third set of instructions which, when said user terminal changes its affiliation from a first said access point to a second said access point, is adapted to control an additional node other than said first and second access points and said other node to send data packets intended for receipt by said user terminal to said second access point after having updated its respective address resolution cache based on said message while said other node continues to send data packets intended for said user terminal to said first access point which continues to send said data packets received from said other node to said user terminal without sending said data packets to said second access point.

25. A computer-readable medium of instructions as claimed in claim 24, wherein:
said additional node includes a said access point.

26. A computer-readable medium of instructions as claimed in claim 24, wherein:
said other node includes a said access point.

27. A computer-readable medium of instructions as claimed in claim 24, further comprising:
a fourth set of instructions which is adapted to control said second access point to issue said message over said core network as an address resolution request for an address of said user terminal which has changed its affiliation thereto.

28. A computer-readable medium of instructions as claimed in claim 27, wherein:
said address resolution request includes an address resolution protocol request.

29. A computer-readable medium of instructions as claimed in claim 27, wherein:
said address of said user terminal includes an Internet protocol address assigned to said user terminal.

30. A computer-readable medium of instructions as claimed in claim 24, further comprising:
a fifth set of instructions, adapted to controlling a said access point with which a said user terminal is affiliated is adapted to transmit a received data packet to said user terminal via a wireless communications link.

31. A computer-readable medium of instructions as claimed in claim 24, wherein:
each said address resolution cache includes an address resolution protocol cache.

32. A computer-readable medium of instructions as claimed in claim 24, wherein:
said other node includes a media server, a DNS server or an IP gateway router.

33. A computer-readable medium of instructions as claimed in claim 24, further comprising:
a sixth set or instructions, adapted to control each said access point to provide any said user terminal with communications access to said core network when said user terminal is participating in an ad-hoc network.

* * * * *